United States Patent
Schauber et al.

(10) Patent No.: US 11,479,629 B2
(45) Date of Patent: Oct. 25, 2022

(54) CROSSLINKING OF POLYARYLETHERKETONES

(71) Applicant: Freudenberg SE, Weinheim (DE)

(72) Inventors: Thomas Schauber, Weinheim (DE); Marco Sutter, Weinheim (DE); Anke Zeller, Alsbach-Haehnlein (DE); Kira Truxius, Darmstadt (DE); Christoph Krafft, Imbach (DE); Ivan Schmalzel, Schifferstadt (DE); Michael Schmitt, Abtsteinach (DE); Mirco Niklas, Fuerth (DE); Stefan Behle, Moerlenbach (DE); Juergen Wenzel, Weinheim (DE); Bernd Havemann, Schriesheim (DE)

(73) Assignee: FREUDENBERG SE, Weinheim (DE)

( * ) Notice: Subject to any disclaimer, the term of this patent is extended or adjusted under 35 U.S.C. 154(b) by 0 days.

(21) Appl. No.: 17/266,633

(22) PCT Filed: Aug. 5, 2019

(86) PCT No.: PCT/EP2019/071035
§ 371 (c)(1),
(2) Date: Feb. 8, 2021

(87) PCT Pub. No.: WO2020/030599
PCT Pub. Date: Feb. 13, 2020

(65) Prior Publication Data
US 2021/0309784 A1 Oct. 7, 2021

(30) Foreign Application Priority Data
Aug. 9, 2018 (DE) .................... 10 2018 119 446.3

(51) Int. Cl.
*C08G 8/28* (2006.01)
*C08G 8/02* (2006.01)

(52) U.S. Cl.
CPC ....... *C08G 8/28* (2013.01); *C08G 8/02* (2013.01)

(58) Field of Classification Search
CPC .. C08G 8/28; C08G 8/02; C08G 65/48; C08G 2650/40; C08G 75/22; C08L 71/00;
(Continued)

(56) References Cited

U.S. PATENT DOCUMENTS 6,887,408 B2    5/2005  Yuan
2004/0222169 A1* 11/2004 Yuan .................... B01D 67/003
                                                            210/767
(Continued)

FOREIGN PATENT DOCUMENTS

RU    2575032 C2    9/2014
TW    200710165 A    3/2007
WO    WO 2010011725 A2   1/2021

OTHER PUBLICATIONS

Thompson et al., "A Novel Method for Crosslinking Polyetheretherketone", Journal of Applied Polymer Science, Aug. 1988, p. 1113-1120, John Wiley & Sons, Inc, New York, USA.
(Continued)

*Primary Examiner* — Randy P Gulakowski
(74) *Attorney, Agent, or Firm* — Leydig, Voit & Mayer, Ltd.

(57) ABSTRACT

Provided is a method for the production of a crosslinked molded body containing polyaryletherketone (PAEK), comprising the steps of (a) providing a mixture comprising a PAEK and a crosslinker, (b) preparing a molded body from the mixture, and (c) thermally treating the molded body at a temperature at which PAEK crosslinks, thereby obtaining the crosslinked molded body, and wherein the crosslinker is a di(aminophenyl) compound comprising two aminophenyl rings, wherein the two aminophenyl rings are joined together via an aliphatic group having a carbocyclic rest.

19 Claims, 2 Drawing Sheets

(58) Field of Classification Search
CPC ...... C08L 2205/02; C08L 79/04; C08L 81/06; C08J 3/242
See application file for complete search history.

(56) References Cited

U.S. PATENT DOCUMENTS

| | | | |
|---|---|---|---|
| 2010/0022718 A1* | 1/2010 | Tu | C08G 65/48 525/471 |
| 2011/0139466 A1* | 6/2011 | Chen | C08L 71/00 166/387 |
| 2015/0219990 A1* | 8/2015 | Malik | G03F 7/0387 428/473.5 |
| 2017/0107323 A1 | 4/2017 | Towle | |
| 2019/0189304 A1* | 6/2019 | Jeong | H01L 21/561 |
| 2020/0172669 A1 | 6/2020 | Song | |

OTHER PUBLICATIONS

U.S. Appl. No. 16/568,125, filed Sep. 11, 2019, Pending.

\* cited by examiner

CROSSLINKING OF POLYARYLETHERKETONES

CROSS-REFERENCE TO PRIOR APPLICATIONS

This application is a U.S. National Phase application under 35 U.S.C. § 371 of International Application No. PCT/EP2019/071035, filed Aug. 5, 2019, and claims benefit to German Patent Application No. DE 10 2018 119 446.3, filed on Aug. 9, 2018. The International Application was published in German on Feb. 13, 2020 as WO 2020/030599 under PCT Article 21(2).

FIELD

The invention relates to a method for producing a molded body made of polyaryletherketones (PAEK) and a crosslinker. The invention also relates to molded bodies obtainable using the method, and to sealing articles.

BACKGROUND

Polyaryletherketones (PAEK) such as polyetheretherketones (PEEK) are semicrystalline high performance polymers that have high temperature and media resistance. They consist of alternating keto, ether and aryl groups. One advantage of PAEK is thermoplastic processability. However, thermoplastics have an intrinsically given limit in terms of temperature resistance. In order to increase the temperature resistance and the mechanical stability of the PAEK, it has been proposed to crosslink the polymer chains. For crosslinking, methods in which the PAEK are crosslinked with diamines are used in the prior art. Here, imine bonds (Schiff's bases) are formed, which can impart a higher stability to the crosslinked polymers. A disadvantage here is that such crosslinked polymers are not capable of being used. They therefore cannot readily be thermoplastically processed from a melt of the polymer.

The method for chemical crosslinking of polyetheretherketones (PEEK) with diamines was first described by Thompson and Farris (Journal of Applied Polymer Science, 1988, vol. 36, 11 13-1120). Polyetheretherketone is first modified in diphenylsulfone as solvent by linking paraphenylenediamine.

The solvent must be separated off by drying and further purification. It is problematic that cross-links are already formed in the process described, and thereby also in the case of covalent bonding. The glass transition temperature and the temperature resistance are increased and the thermoplastic processability is lost. The polymer mass obtained is therefore not thermoplastically crosslinked from the melt but rather by hot pressing.

Yurchenko et al. (2010, Polymer 51, 14-1220) have studied the method and products described by Thompson and Farris more accurately. They describe an analogous reaction of PEEK and phenylenediamine in diphenylsulfone as solvent, in which the PAEK is modified and crosslinked and characterized after removal of the solvent and purification by hot pressing. Thermoplastic processing is also not described. The investigation shows that the products have a higher stability than uncrosslinked PEEK, but this is still in need of improvement.

WO 2010/01 1725 A2 describes a plurality of amine crosslinkers for crosslinking PAEK. However, the document contains only a single synthetic example, which describes the crosslinking of PAEK with diphenylamine in accordance with the literature cited above, in which first a reaction takes place in diphenylsulfone as solvent.

Methods for crosslinking PAEK with non-aminic crosslinkers are described in U.S. Pat. No. 6,887,408 B2.

In order to crosslink PAEK, it has also been proposed in the prior art to functionalize the polymers themselves with crosslinkable amino groups. Such processes are described, for example, in US 2017/0107323 A1. A disadvantage here is that the functionalization of the PAEK with amino groups is relatively complex. In addition, the crosslinking of functionalized PAEK cannot be controlled as easily and variably as with a low-molecular-weight crosslinker.

The methods described in the prior art for crosslinking PAEK with diamines with low molecular weight crosslinkers are carried out in the presence of a high proportion of solvent, the moldings being produced by hot pressing (compression molding). The products are more temperature stable than comparable non-crosslinked PAEK. However, it is disadvantageous that in this way crosslinked PAEK have a relatively low stiffness, since the crystallinity of the PAEK is lost when the polymers are dissolved in solvent. In the further processing, the crystallinity can at best be recovered to a small extent due to the intrinsic steric hindrance of the chains by the crosslinking sites. It is disadvantageous that the methods as a whole are very complex, because they also require a multiplicity of work steps because of the removal of the solvent. A further disadvantage is that the moldings are produced by hot pressing, which limits the application possibilities in comparison with thermoplastic processing. Hot pressing and comparable processes are carried out with non-conductive materials which cannot be converted into thermoplastic melts. As a result, the deformability is limited and no thin-walled or complex molded bodies can be produced. For these reasons, such methods can also be automated only to a very limited extent. Therefore, efficient and cost-effective industrial production cannot take place on the basis of the known solvent-based methods.

In WO 2010/011725 A2 it is also theoretically proposed to produce crosslinked PAEK by extrusion. However, there is no evidence that the PAEK can be extruded with low molecular weight crosslinkers, provided that products with advantageous properties can be obtained. There is also no adequate success expectation. On the one hand, it is problematic that the crosslinking already commences at the required high melting temperatures at which the components have to be mixed and processed. Secondly, PAEK cannot be expected to be miscible and processable with such aminic crosslinkers in the absence of a solvent. In practice, segregation processes are frequently observed in the incorporation of low-molecular-weight components into polymers. However, homogeneous distribution of the crosslinker in the polymer is absolutely necessary for obtaining a stable product.

A further disadvantage is that the handling of volatile diamines at high temperature is accompanied by considerable risks for the user and a high environmental load.

It would therefore be desirable to provide methods and moldings that overcome the disadvantages described.

SUMMARY

In an aspect, provided is a method for production of a crosslinked molded body containing polyaryletherketone (PAEK), the method comprising the steps of (a) providing a mixture comprising a PAEK and a crosslinker, (b) preparing a molded body from the mixture, and (c) thermally treating the molded body at a temperature at which PAEK crosslinks, thereby obtaining the crosslinked molded body, and wherein the crosslinker is a di(aminophenyl) compound comprising two aminophenyl rings, wherein the two aminophenyl rings are joined together via an aliphatic group having a carbocyclic rest.

Also provided in an aspect is a molded body, comprising a crosslinked matrix of polyaryletherketones (PAEK), wherein the PAEK is crosslinked with a linker L which is a diphenyl rest comprising two phenyl rings, in which the two phenyl rings are connected to one another via an aliphatic group comprising a carbocyclic rest, wherein the PAEK is connected via imine bonds to the two phenyl rings of the linker, and wherein the molded body is obtainable by a method, as disclosed herein.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
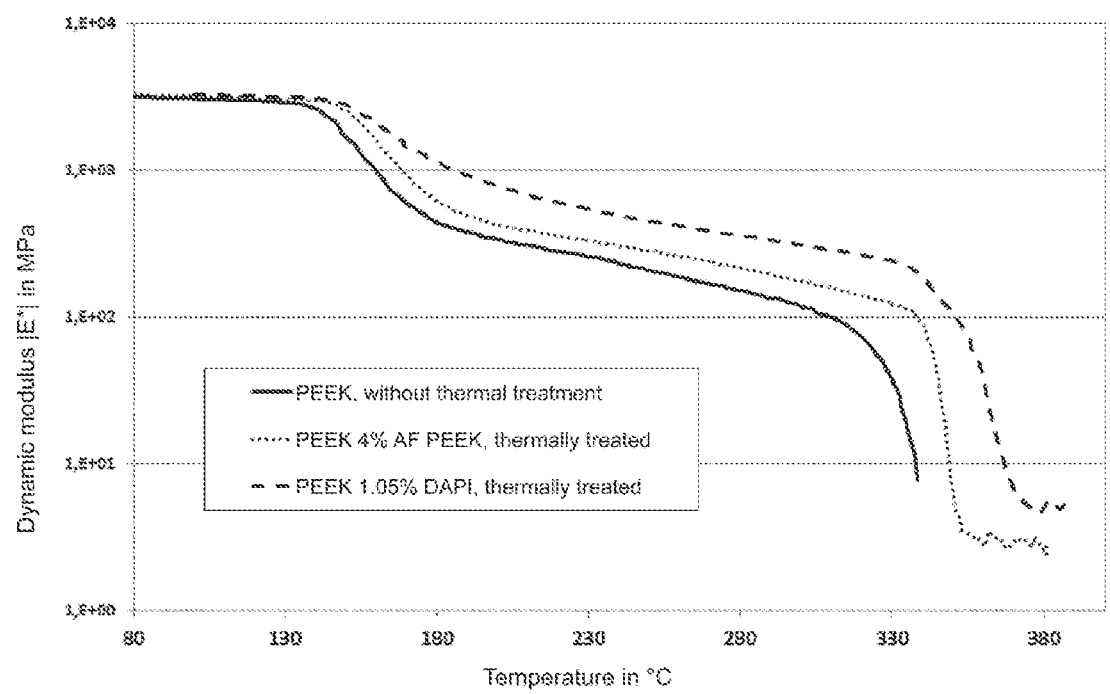
FIG. 1 shows the development of the complex dynamic module with increasing temperature of a molded body according to the invention (PEEK with 1.05% DAPI, thermally treated, dashed curve) compared to the standard base material (PEEK without thermal treatment, solid line) and to another material (PEEK, 4% AF PEEK, thermally treated, dotted line).

Disclosed herein are methods and products which overcome the disadvantages described above.

In particular, an aspect is to provide materials based on PAEK which have high stability and good processability. The materials in an aspect have in particular a high temperature resistance and a high stiffness (modulus) at high temperatures. They in an aspect have a good resistance to chemicals and a low combustibility. The materials in an aspect have a low creep tendency and a rubber-elastic behavior in the high-temperature range.

In particular, an aspect is to provide materials which have a high stability but are nevertheless easy to process. The materials in an aspect may be able to be produced efficiently and cost-effectively in a simple manner. In this case, it would be particularly advantageous if the materials are thermoplastically processable. In particular, less efficient methods such as hot pressing are less desirable.

The methods in an aspect may also be possible to carry out as environmentally friendly as possible and without endangering the users.

Surprisingly, an aspect on which the invention is based is achieved by the method, molded bodies and sealing articles according to the claims.

The invention relates to a method for producing a crosslinked molded body containing polyaryletherketone (PAEK), comprising the steps of (a) providing a mixture comprising a PAEK and a crosslinker,
(b) preparing a molded body from the mixture, and
(c) thermally treating the molded body at a temperature at which PAEK is crosslinked, thereby obtaining the crosslinked molded body, and wherein the crosslinker is a di(aminophenyl)compound in which the two aminophenyl rings are joined together via an aliphatic group having a carbocyclic rest.

Polyetherketones (PEK) are polymers composed of alternating ketone (R—CO—R) and ether groups (R—O—R) groups. In the case of polyarylether ketones (PAEK), an aryl group linked in the (1,4) position is located between the functional groups. The PAEK have a partially crystalline, rigid structure which gives the materials comparatively high glass transition and melting temperatures.

The invention relates to a crosslinking reaction in which the polymer chains of PAEK are covalently and intermolecularly interconnected. In step (a), a mixture containing the PAEK and the crosslinker is provided. In this case, it is preferred that the temperature in step (a) is adjusted in such a way that no substantial reaction still takes place between the PAEK and the crosslinker. It is advantageous here that the aminic crosslinking of PAEK with the crosslinkers described in accordance with the invention starts only at higher temperatures. Covalent attachment of the crosslinker to the PAEK, as described in the prior art, is not required in the simple method according to the invention.

In step (b), a molded body is produced from the mixture. The step (b) of preparing the molded body comprises all the steps by which the mixture is brought into the three-dimensional form, which is maintained in the cured, crosslinked state. The molded body is preferably produced by means of thermoplastic molding methods. In this case, it is preferred that the molded body is produced before and/or during the crosslinking. Shaping is particularly preferably effected before step (c) because the mixture is advantageously thermoplastically processable and moldable prior to crosslinking, in particular by hot pressing, extrusion and/or spray-coating.

Step (c) comprises thermally treating the molded body at a temperature at which PAEK is crosslinked, thereby obtaining the crosslinked molded body.

In the crosslinking, two imine bonds are formed between two keto groups of the PAEK chains and the two amino groups of the crosslinker. The resulting bridge in the form of an imine is also referred to as Schiffs base, since the imine nitrogen does not carry a hydrogen atom, but is connected to an organic molecule. Crosslinking takes place as completely as possible, so that as far as possible all amino groups of the diamine used react with the carbonyl groups of the PAEK. An advantage of a complete crosslinking is increased heat distortion resistance and increased stiffness (modulus). Nevertheless, only partial crosslinking should also be encompassed by the term "crosslinked". Only partial crosslinking can be present if sufficient diamine has not been used for complete incorporation of all PAEK chains into the network. In this case, the material generally has a higher elongation at break than the completely crosslinked material. The imine bonds impart a high stability to the molded body. According to the invention, the molded body is preferably a molded body based on PAEK. In this case, "PAEK-based" means that the PAEK is the essential structuring polymer component of the molded body. In one embodiment, it is preferred that the PAEK is the only polymeric component of the molded body. In a further embodiment, the PAEK is present in a mixture with further polymers, in particular thermoplastic polymers. Preferred further polymers are polyphenylene sulfide (PPS), polyamideimide (PAI), polyphthalamide (PPA), partially aromatic polyamides, thermoplastic polyimide (TPI), liquid crystalline polyesters (LCP). Preferred mass ratios between PAEK and further polymers, in particular thermoplastic further polymers, are 1:1 to 100:1, preferably 5:1 to 100:1, particularly preferably 10:1 to 100:1. Furthermore, the molded body can contain fillers such as, for example, fibers and/or customary additives, such as processing aids, and/or functional components. The cross-linked PAEK thereby forms a matrix in which optionally present additive equivalents are distributed.

The crosslinker is a di(aminophenyl)compound. Such compounds have two interconnected aminophenyl rings. The compounds are therefore primary diamines. In one embodiment of the invention, each phenyl ring has only a single amino group. However, it is likewise conceivable for the phenyl rings to have two or three amino groups independently of one another. The compounds are low molecular weight and not polymers. In addition to the amino groups, the phenyl rings may have further substituents, such as alkyl or halogen groups. The two aminophenyl rings are joined together via an aliphatic group. Aliphatic groups consist only of carbon and hydrogen and are not aromatic. Apart from the two phenyl rings, the crosslinkers preferably have no further double or triple bonds. The aliphatic group has a carbocyclic rest. Carbocyclic rests are hydrocarbon rings which may have, for example, 4 to 7 carbon atoms, preferably 5 or 6 carbon atoms. The carbocyclic rest may here comprise double bonds of the phenyl rings. Preferably, the carbocyclic group has only a single aliphatic hydrocarbon ring. The aliphatic group preferably has a total of 5 to 15 carbon atoms, in particular 6 to 8 carbon atoms. Because of the aliphatic group between the carbocyclic rests, the two phenyl rings are not conjugated.

According to the invention, it has surprisingly been found that PAEK, which is crosslinked with such di(aminophenyl) compounds, has particularly advantageous properties. In particular, the crosslinked PAEK has a particularly high thermal stability and mechanical stability, and in particular a particularly high glass transition temperature and stiffness. Without being bound by theory, it is believed that the carbocyclic rest may assist in the formation of a particularly rigid, partially crystalline polymer structure that confers high stability to the product. It is also assumed here that an advantageous and suitable spacing of the PAEK polymer chains can be adjusted via the crosslinker with the carbocyclic rest. Overall, the crystalline structure of the PAEK appears to be less affected or even advantageously supported by such crosslinkers.

In a preferred embodiment, the crosslinker is an annulated compound in which only one of the two phenyl rings is annulated to the carbocyclic residue. Annulation (condensation) refers to the attachment of another ring to a ring of a cyclic molecule. The two annulated rings share two carbon atoms and thus a C—C double bond of the phenyl ring. The use of such annulated crosslinkers has the advantage that a particularly rigid and consistent bond can be formed between the PAEK chains, whereby a particularly high temperature stability and rigidity of the products can be achieved.

The amino groups can in principle be present at any position of the phenyl group, i.e. in the ortho, meta or para position with respect to the aliphatic compound of the two phenyl rings. In the embodiment in which each phenyl group has only a single amino group, it is preferred that the two amino groups are spaced as far as possible from one another.

This can be achieved when the two amino groups are attached at the para position with respect to the aliphatic compound and/or to the 4 and 4' position of the phenyl rings. Thus, in a preferred embodiment, the diaminodiphenyl compound is a 4,4'diaminodiphenyl compound. In general, the advantage of amino groups spaced as far apart as possible can be that the formation of undesired intramolecular reactions, in which a crosslinker forms two bonds with the same PAEK polymer chain, is reduced. Such intramolecular reactions with the crosslinker may interfere with the crystalline structure of the PAEK without being crosslinkable, thereby reducing the stability of the product.

In a preferred embodiment of the invention, the cross-linker is an asymmetric compound.

In a preferred embodiment of the invention, the cross-linker is a compound of general formula (I):

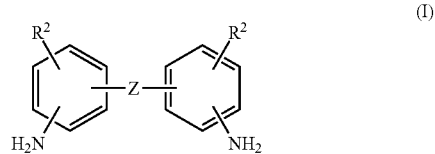

wherein $R^1$ and $R^2$ are independently selected from H, substituted or unsubstituted alkyl having 1 to 20 C atoms, in particular having 1 to 4 C atoms, in particular methyl or ethyl, substituted or unsubstituted aryl having 5 to 12 C atoms, F and Cl, and wherein Z is the aliphatic group having a carbocyclic rest. In this case, each phenyl ring can have one, two or three rests $R^1$ or $R^2$ which are selected independently of one another. A phenyl ring preferably has only one rest $R^1$ and/or $R^2$. Particular preference is given to the rests $R^1$ and $R^2$ say crosslinker respectively without additional rests $R^1$ and $R^2$ are relatively readily available and can be processed to highly stable cross-linked PEAK.

The rest Z may be bonded to any phenyl rest via two or via a bond. The rest Z is preferably connected to a phenyl rest via two bonds and to the second phenyl rest via a bond.

In a preferred embodiment, the crosslinker is a compound of general formula (II):

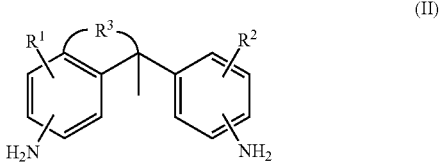

wherein $R^1$ and $R^2$ are independently selected from H, substituted or unsubstituted alkyl having 1 to 20 C atoms, in particular having 1 to 4 C atoms, in particular methyl or ethyl, substituted or unsubstituted aryl having 5 to 12 C atoms, F and Cl, and wherein $R^3$ is a carbocyclic rest having 2 to 3 C ring atoms and which may be substituted by at least one alkyl group having 1 to 4 C atoms, in particular methyl or ethyl. The rests $R^1$ and $R^2$ are particularly preferably each H. The carbocyclic rest $R_3$ is therefore preferably a pentyl or hexyl rest. Such crosslinkers have the advantage that a particularly good combination of temperature stability and mechanical stability of the crosslinked PAEK can be obtained.

In a preferred embodiment, the crosslinker is a compound of general formula (III):

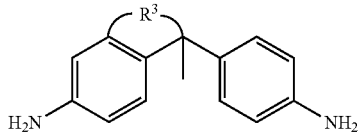

(III)

Wherein R is selected from ³, as indicated above. Such crosslinkers have the advantage that a particularly good combination of temperature stability and mechanical stability of the crosslinked PAEK can be obtained.

In a preferred embodiment, the crosslinker has the formula (IV):

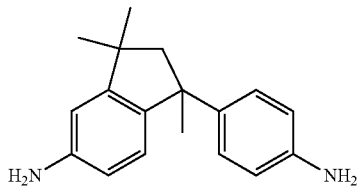

(IV)

In the experiments carried out, the compound led to a particularly advantageous combination of temperature stability and mechanical stability of the crosslinked PAEK. The chemical designation is 1-(4 aminophenyl)-1,3,3-trimethyl-indan-5-amine (CAS no. 54628-89-6).

In a further preferred embodiment, the crosslinker has the formula (V):

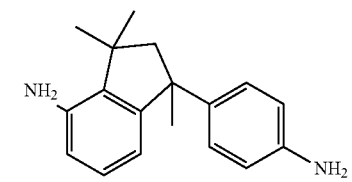

(V)

In the tests carried out, the compound likewise leads to a particularly advantageous combination of temperature stability and mechanical stability of the crosslinked PAEK. The chemical designation is 1-(4 aminophenyl)-1,3,3-trimethyl-indan-6-amine.

In a further preferred embodiment, the crosslinker comprises a mixture of compounds of the formula:

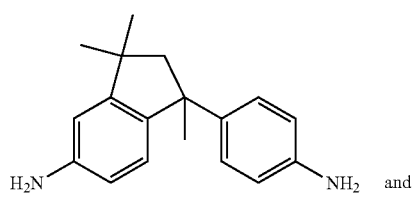

(IV)

and

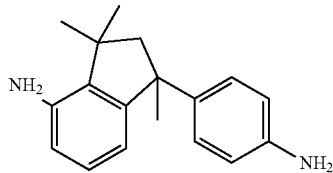

(V)

In the tests carried out, this crosslinker likewise leads to a particularly advantageous combination of temperature stability and mechanical stability of the crosslinked PAEK.

In a further preferred embodiment, the crosslinker has the formula (VI):

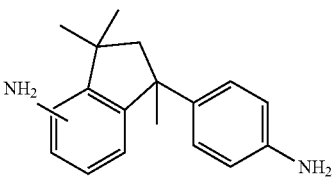

(VI)

In the tests carried out, this crosslinker likewise leads to a particularly advantageous combination of temperature stability and mechanical stability of the crosslinked PAEK. The chemical designation is 1-(4 aminophenyl)-1,3,3-trimethylindan-amine (CAS no. 68170-20-7). Here, the amino group may occur at the aromatic ring of the indane at all positions. Also comprised are mixtures of 1-(4 aminophenyl)-1,3,3-trimethylindanamines in which the amino group is located at various positions on the aromatic ring of the indane.

It is preferred according to the invention to use a single concrete crosslinker in order to obtain material properties which are as uniform as possible. However, it is also possible to use mixtures of two or more crosslinkers.

The amount of crosslinker is adjusted with respect to the desired degree of crosslinking. The proportion of the crosslinker in relation to the PAEK can be 0.05 wt % to 15 wt %, in particular 0.1 wt % to 5 wt %. In a preferred embodiment, the proportion of crosslinker is 0.1 to 1.5 wt %. It has been found that the stability of the product with such a crosslinker fraction can be particularly advantageous. In particular, when adjusting the amount of crosslinker in this range, a significant improvement in elongation at break can be achieved.

In a preferred embodiment, the crosslinker has a boiling point corresponding to about 300° C., more preferably about 350° C. or about 400° C. This is advantageous because such crosslinkers have only a relatively low vapor pressure at the required high crosslinking temperatures. Preferably, the boiling point of the crosslinker is between 300° C. and 500° C., in particular between 350° C. and 500° C. The melting point of the crosslinker is advantageously below the melting point of the PAEK. Good processability and a low risk to the users are thereby achieved.

Basically any polyaryletherketones can be used as the polymer component. Polyaryletherketones are characterized by linear polymer chains of aryl, ether and keto groups. The compounds of this class of substances differ by virtue of the different arrangement of these groups and their ratio in the molecule. The PAEK can be, for example, a polyetheretherketone (PEEK), a poly(ether ketone ketone) (PEKK), a poly (ethereetheretherketone) (PEEEK) or a poly (etheretherketonketone) (PEEKK). The compounds of this class of substances have keto groups which can be joined to form imine bonds. Mixtures of different polyaryletherketones can also be used here. It is preferable to use a single PAEK because a high crystallinity and associated temperature stability can thereby be achieved.

In a preferred embodiment, the polyaryletherketone (PAEK) is a polyetheretherketone (PEEK, CAS number 29658-26-2). More preferably, the polyaryletherketone (PAEK) is a polyetheretherketone PEEK having a melting range of 335° C. to 345° C. PEEK, which is crosslinked according to the invention, has been found to have particularly advantageous properties with regard to temperature and mechanical stability.

It is preferable that the polyaryletherketone (PAEK) at 380° C. shows a melt viscosity in the range of 5 $cm^3/10$ min to 250 $cm^3/10$ min, in particular 50 $cm^3/10$ min to 200 $cm^3/10$ min. The measurement is carried out in accordance with DIN ISO 1130, wherein the material is melted at 380° C. and loaded with a 5 kg ram, after which the flowability is determined. Commercially available PAEK, in particular PEEK variants, are generally suitable. Melt viscosity generally correlates with the molecular weight of the polymer chains. It has been found that such a melt viscosity is advantageous because, according to the invention, both good thermoplastic processability and miscibility are achieved, and a homogeneous product with high stability, and in particular high stiffness, can also be obtained. It is particularly preferred here to use such a PAEK, in particular PEEK with a melt viscosity as mentioned above, and the crosslinker in an amount of 0.1 wt % to 5 wt %, in particular between 0.1 wt % to 1.5 wt %, with respect to the PAEK, in particular PEEK. With such a ratio and properties of the starting materials, particularly good processability and temperature stability of the products can be achieved. In particular, the rigidity, which is characterized by a high tensile modulus, is particularly high. Furthermore, such a PAEK, in particular PEEK, can be processed at a temperature which still allows thermoplastic mixing, without the crosslinking reaction proceeding too rapidly during this process. As a result, a molding composition is obtained which can be processed further very well thermoplastically.

The mixture provided in step (a) can be prepared by conventional compounding methods. In such processes, the mixture is intensively mixed, preferably as a melt, for example in a screw. The temperatures in the mixing device are preferably adjusted such that the mixture is readily processable and has a viscosity suitable for compounding. In compounding, an intermediate can be obtained, for example a granulate.

The mixture is preferably prepared at a temperature at which no or no substantial crosslinking takes place. According to the invention, it is not necessary that, as in the methods described in the prior art, a covalent attachment of the crosslinkers to the PAEK is already effected via aminic bonds. This is advantageous because, according to the invention, such an additional reaction step can be omitted, which would have to be precisely controlled in order to prevent an undesired further reaction of the intermediates and a premature crosslinking resulting therefrom.

In the preparation of the mixture, intensive mixing is effected by suitable means, such as stirring or kneading means, in order to achieve a uniform distribution of the crosslinker in the polymer. This is of great importance in order to obtain uniform material properties with regard to stability. In a preferred embodiment, the preparation is a step of the process which takes place before step (a) in a step (a0). Preferably, the crosslinkable mixture is further processed in step (b) after the preparation without further intermediate steps which modify the composition.

In a particularly preferred embodiment of the invention, the mixture contains no solvent. According to the invention, it has surprisingly been found that mixtures of PAEK and crosslinker can be processed without the use of a solvent, with intimate mixing taking place.

Preferably, the mixture is heated to a temperature at which it is in liquid form. In order to obtain a homogeneous mixture, it is preferred here to select the temperature and residence time in such a way that no significant crosslinking takes place.

In a preferred embodiment, the crosslinker is added continuously to the PAEK. The components may be present in liquid or in solid form. In this way, a particularly uniform mixture can be obtained. The crosslinker is preferably added with thorough mixing, for example with stirring and/or kneading. In a preferred embodiment, the crosslinker is supplied in the form of a concentrate. This has the advantage that the crosslinker can be metered in a better manner, whereby the uniformity of the mixture can be improved. Overall, a particularly homogeneous mixture can be obtained with continuous addition of the crosslinker, so that particularly suitable crosslinking is achieved. This makes it possible to avoid the formation of areas of strong or low crosslinking, which can lead to damage to the product during thermal or mechanical loading. In this way, particularly good properties with regard to temperature stability and mechanical stability can be achieved.

In step (b), a molded body is produced from the mixture. In a preferred embodiment, the molding is produced in step (b) by thermoplastic shaping. This means that the mixture can be formed from the melt in a non-crosslinked and/or at least not significantly crosslinked state, since otherwise the thermoplastic processing would no longer be possible. If too many crosslinking sites are present, the PAEK intermediate is no longer able to be used and is no longer readily thermoplastically formable. The mixture in an aspect may be exposed to the high processing temperatures only over a short period of time before shaping. Therefore, the thermoplastic processing is preferably carried out in such a way that the residence time of the mixture in the device is as low as possible. In this case, it is preferred that the processing is carried out in such a way that the essential part of the crosslinking reaction, and thereby for example more than 80%, exceeds 90% or more than 95% of the crosslinks only after shaping, i.e. in step (c).

In a preferred embodiment, the mixture is processed in step (b) by extrusion, hot pressing and/or injection molding and is formed in the process. These methods are particularly suitable for the simple and efficient processing of thermoplastic polymer compositions.

The extrusion can be effected by known methods. During extrusion (extrusion), solid to thick liquid curable compositions are pressed out continuously from a shaping opening (also referred to as nozzle, die or mouthpiece) under pressure. In this case, bodies with the cross section of the opening, called extrudate, are produced in theoretically any length. Preferably, the extrusion is carried out at a temperature of at least 320° C., preferably at least 350° C.; preferably between 320° C. and 400° C., and in particular between 350° C. and 390° C.

The hot pressing is a method in which the molding compound is introduced into the previously heated cavity. The cavity is closed using a pressure piston. As a result of the pressure, the molding compound acquires the shape predetermined by the tool. Preferably, the hot pressing is carried out at a temperature of at least 300° C., preferably at least 350° C.; preferably between 320° C. and 400° C., and in particular between 350° C. and 400° C.

Injection molding (often also referred to as injection molding or injection molding) is a molding process used in plastic processing. The plastic is plasticized with an injection molding machine and injected under pressure into a mold, the injection mold. In the tool, the material returns to the solid state by cooling and is removed as a molded body after the tool has been opened. The cavity (cavity) of the tool determines the shape and the surface structure of the product.

The processing is particularly preferably effected by extrusion and an appropriate injection molding. The mixture of the PAEK and the crosslinker is melted in these processes if it is not yet in liquid form.

In step (b), the mixture is preferably introduced into an extruder, an injection molding machine or a hot press, melted at high temperatures, for example in the range from 300° C. to 400° C., and brought into a desired shape.

In step (c), the molded body is thermally treated at a temperature at which PAEK is crosslinked, whereby the crosslinked molding is obtained. The PAEK can thereby be intermolecular crosslinked with the crosslinker. The temperature in step (c) can be set relatively high, since the usable crosslinkers according to the invention have relatively high melting points and boiling points. This is advantageous because such crosslinking reactions are generally promoted at high temperature. Preferably, however, the temperature is below the melting range of PAEK.

Surprisingly, it was found that in the system according to the invention the crosslinking reactions take place already below the melting range of the polymer and of the molding. This was unexpected since it is generally assumed that crosslinking reactions take place only at temperatures above the melting range of the polymer and the molding.

It is further assumed in the prior art that such crosslinking reactions take place relatively rapidly within minutes or a few hours. However, it has been found according to the invention that the crosslinked PAEK can have particularly advantageous properties if the heating of the shaped article in step (c) is carried out over a longer period of time, preferably of at least 6 hours, for example from 6 hours to 30 days. It has been found that thermal stability and mechanical stability can be substantially improved by such thermal treatment.

In particular, it has been found that thermal treatment can improve the stiffness of the samples at elevated temperatures. In this case, it has been observed that a thermal treatment for a certain duration can significantly improve the stiffness, saturation being able to occur in the first place, so that the stiffness is not or only insignificantly improved in the case of further thermal aftertreatment. However, further thermal aftertreatment results in an improvement in the heat distortion resistance. It has been found that the heat distortion resistance can also increase with prolonged thermal aftertreatment, so that even after 14 days a significant improvement can still be observed.

In a preferred embodiment, the molded body obtained in step (b) is subjected to a thermal treatment for at least 6 hours, in particular for more than 2 days or for more than 2.5 days. In a preferred embodiment of the invention, the thermal treatment is carried out over a period of from 2 to 30 days, in particular for 2.5 to 20 days. This is advantageous because the homogeneity of the products, and thereby the thermal and mechanical stability, can be improved. The thermal treatment preferably takes place with exclusion of oxygen.

In a preferred embodiment, the thermal treatment in step (c) is carried out at a temperature of at least 250° C., preferably at least 300° C. Preferably, the temperature in step (c) is between 280° C. and 415° C., more preferably between 300° C. and 400° C. At such temperatures, efficient three-dimensional crosslinking can proceed sufficiently quickly without impairing the thermoplastically produced articles, for example by decomposition and/or undesired deformation of the moldings.

After crosslinking, the molded bodies are cooled and can be fed to their use or processed further.

The mixture and the molded body may contain customary additives. Additives may, for example, be present in an amount of up to 20 wt %, For example from 0.1 wt % up to 20 wt % and or of 0.1 wt % to 18 wt %, based in each case on the total weight of mixture and/or molding. Customary additives are for example dyes, processing aids.

The mixture and the molded body may contain customary fillers, such as, in particular, tribologically active and/or flexibilizing fillers and/or reinforcing fibers. For example, the fillers may be present in an amount of up to 80 wt %, for example from 0.1 wt % up to 80 wt % and/or of 0.1 wt % up to 60 wt %, in each case based on the total weight of mixture and/or molding.

The invention also relates to a molded body based on polyaryletherketones (PAEK) which has a crosslinked matrix of PAEK, wherein the PAEK is crosslinked with a linear L which is a diphenyl rest, in which the two phenyl rings are connected to one another via an aliphatic group which has a carbocyclic rest, the PAEK being connected via imine bonds to the phenyl rings of the linker.

The molded body is obtainable in particular by the methods according to the invention, which are described within the scope of this invention. The molded body preferably has the advantageous properties which are described in the context of this invention for the crosslinked PAEK. In the context of this invention, the term molded body refers to products of crosslinked PAEK which have a defined three-dimensional shape. In this case, it is not necessary for the molded body to be a defined object, but it can also be a coating, for example. The molded body can consist of or contain the crosslinked PAEK, for example as a composite material or laminate.

The molded bodies according to the invention can have advantageous, increased rigidities which are characterized by a high tensile modulus. The molded body preferably has a tensile modulus of at least 350 mPa, in particular of at least 400 mPa, and particularly preferably of at least 450 mPa. In particular, the tensile modulus is between 350 mPa and 600 mPa or between 400 mPa and 550 mPa. The tensile modulus is preferably determined at 240° C. in accordance with DIN EN ISO527-2.

It may be desirable not to crosslink the polymer completely in the molding since the elongation at break of the material may decrease with increasing crosslinking. The degree of crosslinking is therefore preferably adjusted with regard to the desired application, for example via the proportion of the crosslinker and the type and duration of the thermal treatment.

The degree of crosslinking is preferably not measured directly, but rather it is determined by suitable test methods, such as for example a high-temperature tensile test, whether the molded body has the desired properties. At very high temperatures, the determination of the dynamic module is appropriate.

The molded bodies can be used in particular in technical fields in which a high temperature resistance and mechanical stability, and in particular a high degree of rigidity, are required. They are particularly suitable for applications as sealing articles, in particular tight and O rings, bushings, bearings, back-up rings, valves, thrust washers, snap hooks, pipes or lines, cables, enclosures and casings, housings of an electrical or chemical application or as a component thereof. They are particularly suitable for uses in which high chemical resistance and resistance to abrasion are required. This relates in particular to applications in oil and gas production, aerospace technology and chemical industry, and to the production of safety-relevant parts, and to the range of energy generation and the automotive industry. Connectors and insulators in the electronics sector are likewise conceivable applications, since the crosslinking leads to a good insulating capacity.

The invention also relates to a sealing article consisting of or containing a molded body according to the invention. The sealing article can be used for static or dynamic applications and in particular for dynamic applications in which it is exposed to high mechanical loads. In particular, the sealing article is suitable for sealing applications in which it is in contact with fluids, such as lubricants, and in which it is exposed to high temperatures, for example above 150° C., and in particular in the range from 180° C. to 400° C.

The inventive methods, moldings and sealing articles solve the object underlying the invention. They have a high temperature resistance and high mechanical stability in conjunction with good processability. In particular, the molded bodies have a high glass transition temperature and a high stiffness, in particular above the glass transition temperature. The high stiffness is accompanied by a reduced creep behavior at high temperatures. The improved temperature resistance is manifested both at the maximum temperature and at the continuous use temperature, in particular in the range from 150° C. to 400° C. The molded bodies also exhibit advantageous rubber-elastic behavior in the high-temperature range. The products exhibit a very good chemical resistance and a reduced combustibility, since the material does not melt due to the crosslinking and no burning material drips off.

The molded bodies according to the invention can be produced in a simple and efficient manner by thermoplastic molding processes. For example, the production can be effected by simple extrusion. In addition, the processes are environmentally friendly and can be carried out without endangering the users, since the crosslinkers used have relatively high boiling points and are not very volatile.

EXEMPLARY EMBODIMENTS

Exemplary Embodiment 1

Mixtures are prepared as indicated in Table 1. Amine functionalized PEEK (hereinafter referred to as "AF PEEK") is prepared using Thompson and Farris, PEEK and p-phenylenediamine, 1988, and ground to powder after complete leaching of diphenylsulfone and unreacted p-phenylenediamine. Determination of the total nitrogen content according to Kjeldahl gives a conversion rate of 95% of the carbonyl groups of the PEEK. The crosslinker used was DAPI (CAS no. 54628-89-6) in a purity of 98%.

TABLE 1

| MIXTURES | |
| --- | --- |
| Ex. no. | Compound |
| 1 (comparison) | PEEK |
| 2 (comparison) | PEEK, 4 wt % AF PEEK |
| 3 | PEEK, 1.05 wt % DAPI |

The mixtures from Table 1 are processed into test specimens by injection molding and subjected to thermal treatment for crosslinking.

TABLE 2

| THERMAL TREATMENT AND TENSILE STRAIN TEST RESULTS | | | | | |
| --- | --- | --- | --- | --- | --- |
| Example No. | Compound | Thermal treatment | Yield strength [MPa] | Tensile strength MPa | Elongation at break % | Tensile modulus [MPa] |
| 1 | PEEK, no additive | None | 14.5 | 47.0 | 274 | 211 |
| 2 a | PEEK, 4% AF PEEK | None | 18.5 | 41.0 | 204 | 241 |
| 2 b | PEEK, 4% AF PEEK | with | 25.2 | 25.2 | 20.8 | 310 |
| 3 | PEEK, 1.05% DAPI | with | 28.1 | 30.8 | 97 | 505 |

The tensile tests are carried out at 240° C. in accordance with the standard DIN EN ISO527-2.

The results show that the sample according to the invention becomes unmeltable by thermal treatment and that the tensile E-modulus of elasticity rises. This clearly shows the advantage of the homogeneity of the DAPI crosslinked samples over the inhomogeneity of the PEEK crosslinked by means of AF PEEK.

Dynamic Mechanical Analysis (DMA)

Dynamic mechanical analysis (DMA) is a thermal method to determine physical properties of plastics. The temperature gradient (temperature gradient) indicates the development of the dynamic module and thus also the stiffness over the measured temperature range. Here, above all the glass transition region ($T_g$) the height of the plateau above the $T_g$, the position of the waste of the module when melting the crystalline phase, and the height of the plateau in the high-temperature range are important.

This was done with thermally treated moldings in the above-described embodiments (see Table 1). The temperature gradients were measured with specimen strips (width approx. 3 mm, thickness approx. 3 mm) under the following conditions: Heating rate 3 K/min, contact force 3N, average elongation 0.5%, expansion ampl.+/−0.1%. The results are shown in FIG. 1 graphically.

FIG. 1 shows the development of the complex dynamic modulus with increasing temperature of the molded body 3 according to the invention (PEEK with 1.05% DAPI, thermally treated, dashed curve) compared to the standard base material 1 (PEEK without thermal treatment, solid line).

As a further reference, the complex dynamic modulus is represented above the temperature of another material 2b (PEEK, 4% AF PEEK, thermally treated, dotted line) crosslinked from standard PEEK, which is crosslinked by thermal aftertreatment with 4% AF PEEK. This AF PEEK was prepared by modification of PEEK according to the method described by Thompson and Farris as well as by Yurchenko et al., incorporated herein by reference.

The results show that the crosslinked PEEK according to the invention have advantageous thermal properties. Improvements in the glass transition region (Tg), at the height of the plateau above the Tg, and with regard to the waste of the module during melting of the crystalline phase and with regard to the height of the plateau in the high-temperature range are achieved for all inventive moldings. The glass transition temperature is also increased as the stiffness at high temperature, in particular in the range above 150° C. The results also show that, especially in the combination of DAPI with PEEK, optimum product properties with regard to the height of the module and the height of the heat distortion resistance can be achieved. The thermal properties can be improved even considerably by lengthening the thermal treatment.

Exemplary Embodiment 2

The DAPI isomer mixture having the CAS number 68170-20-7 (crosslinker having the formula VI) is mixed into a commercial PEEK of medium viscosity by means of two-screw compounder as in the preceding example 1 and the strand is chopped into a granulate.

TABLE 3

MIXTURES

| Ex. Nr. | Compound |
|---|---|
| 1 (comparison) | PEEK |
| 4 | PEEK + DAPI, CAS No. 68170-20-7, thermally treated |

The granules from the mixtures of Table 3 are injection-molded into test specimens and likewise subjected to a thermal aftertreatment. The samples are tested according to Embodiment 1 by means of DMA in the T sweep, wherein the result shown in FIG. 2 is obtained.

Figure 2:
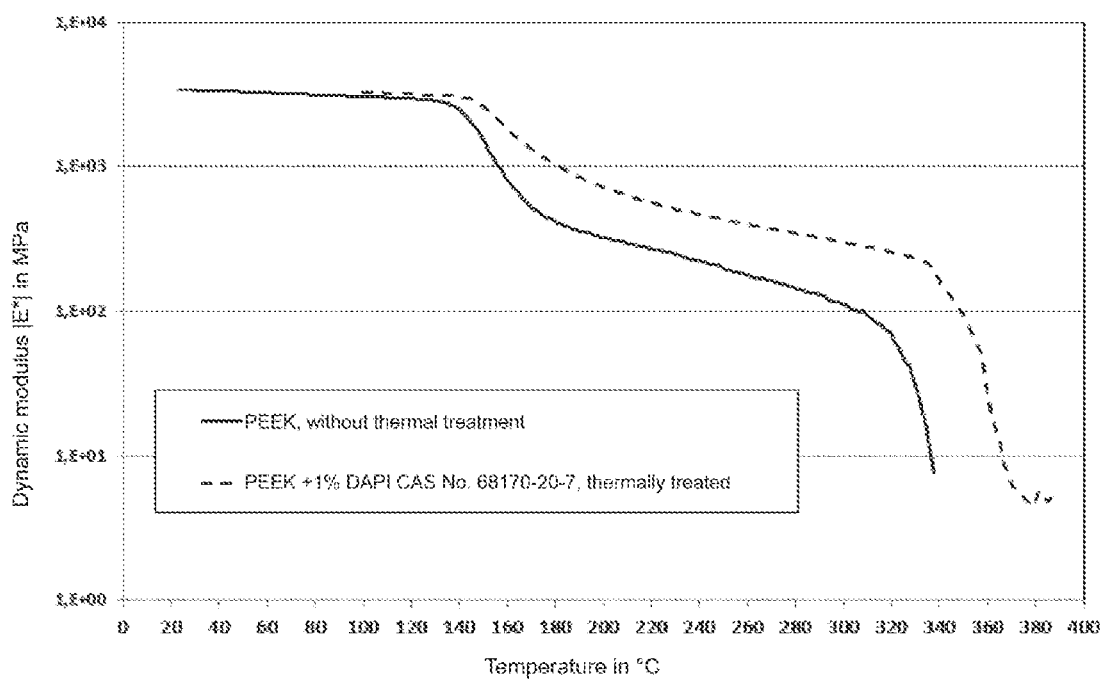
FIG. 2 shows the development of the complex dynamic modulus with increasing temperature of the molded body 4 according to the invention (PEEK with 1% DAPI (CAS no. 68170-20-7), thermally treated, dashed curve) compared to the standard base material 1 (PEEK without thermal treatment, solid line).

FIG. 2 shows the development of the complex dynamic modulus with increasing temperature of the molded body 4 according to the invention (PEEK with 1% DAPI (CAS no. 68170-20-7), thermally treated, dashed curve) compared to the standard base material 1 (PEEK without thermal treatment, solid line).

Here too, the advantageous results discussed with reference to FIG. 1 are obtained in comparable form.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for production of a crosslinked molded body containing polyaryletherketone (PAEK), the method comprising the steps of
    (a) providing a mixture comprising a PAEK and a crosslinker,
    (b) preparing a molded body from the mixture, and
    (c) thermally treating the molded body at a temperature at which PAEK crosslinks, thereby obtaining the crosslinked molded body, and
    wherein the crosslinker is a di(aminophenyl) compound comprising two aminophenyl rings, wherein the two aminophenyl rings are joined together via an aliphatic group having a carbocyclic group, wherein the crosslinker is a compound of general formula (I):

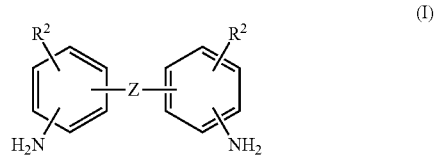

wherein $R^1$ and $R^2$ are independently selected from H, substituted or unsubstituted alkyl having 1 to 20 C atoms, substituted or unsubstituted aryl having 5 to 12 C atoms, F, and Cl; and wherein Z is the aliphatic group having the carbocylclic group.

2. The method according to claim 1, wherein the crosslinking agent is an annulated compound in which one of the two aminophenyl rings is annulated to the carbocyclic group.

3. The method according to claim 1, wherein the crosslinker is a 4,4'-diaminodiphenyl compound, an asymmetric compound, or a combination thereof.

4. The method according to claim 1, wherein the crosslinker is a compound of general formula (II):

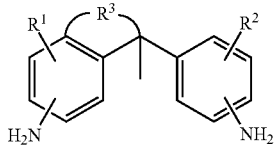

wherein $R^1$ and $R^2$ are independently selected from H, substituted or unsubstituted alkyl having 1 to 20 C atoms, substituted or unsubstituted aryl having 5 to 12 C atoms, F, and Cl; and wherein $R^3$ is a carbocyclic group having 2 to 3 C ring atoms, optionally substituted by at least one alkyl group having 1 to 4 C atoms.

5. The method according to claim 4, wherein the crosslinker is a compound of formula (IV):

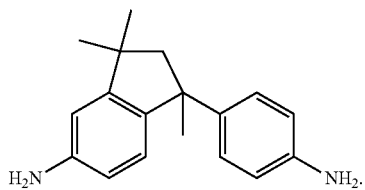

6. The method according to claim 1, wherein the polyaryletherketone (PAEK) is a polyetheretherketone (PEEK).

7. The method according to claim 1, wherein the polyaryletherketone (PAEK) has a melt viscosity in a range from 5 cm³/10 min to 250 cm³/10 min at 380° C., measured in accordance with DIN ISO 1130.

8. The method according to claim 1, wherein the mixture contains no solvent.

9. The method according to claim 1, wherein a temperature in step (b) is at least 300° C.

10. The method according to claim 1, wherein the mixture in step (b) is processed by extrusion, hot pressing, injection molding, or any combination thereof.

11. The method according to claim 10, wherein the molded body obtained in step (b) is subjected to a thermal treatment in step (c) for at least 6 hours.

12. The method according to claim 11, wherein the thermal treatment in step (c) is at a temperature of at least 250° C.

13. A molded body, comprising a crosslinked matrix of polyaryletherketones (PAEK),
wherein the PAEK is crosslinked with a linker L which is a diphenyl group comprising two phenyl rings, in which the two phenyl rings are connected to one another via an aliphatic group comprising a carbocyclic group,
wherein the PAEK is connected via imine bonds to the two phenyl rings of the linker, and
wherein the molded body is obtained by a method according to claim 1.

14. An article of manufacture, comprising a sealing article, a thrust washer, a back-up ring, a valve, a connector, an insulator, a snap hook, a bearing, a bushing, a sealing or O ring, a pipe or line, a cable, an enclosure or casing, or a housing of an electrical or chemical application, wherein the article of manufacture consists of or comprises a molded body according to claim 13.

15. The method according to claim 1, wherein the substituted or unsubstituted alkyl comprises 1 to 4 C atoms.

16. The method according to claim 15, wherein the substituted or unsubstituted alkyl is methyl or ethyl.

17. The method according to claim 4, wherein the substituted or unsubstituted alkyl comprises 1 to 4 C atoms.

18. The method according to claim 17, wherein the substituted or unsubstituted alkyl is methyl or ethyl.

19. The method according to claim 4, wherein $R^3$ is a carbocyclic group having 2 to 3 C ring atoms substituted by at least one alkyl group having 1 to 4 C atoms; or
wherein $R^3$ is a carbocyclic group having 2 to 3 C ring atoms substituted by methyl or ethyl.

* * * * *